US008366042B2

(12) United States Patent
Haselmeier et al.

(10) Patent No.: US 8,366,042 B2
(45) Date of Patent: Feb. 5, 2013

(54) ARRANGEMENT FOR INSTALLING ELECTRIC CABLES IN THE FLOOR REGION OF AN AIRCRAFT

(75) Inventors: Jan Haselmeier, Hemmoor (DE); Michael Bahs, Hamburg (DE)

(73) Assignee: Airbus Operations GmbH (DE)

( * ) Notice: Subject to any disclaimer, the term of this patent is extended or adjusted under 35 U.S.C. 154(b) by 473 days.

(21) Appl. No.: 12/629,171

(22) Filed: Dec. 2, 2009

(65) Prior Publication Data

US 2010/0213314 A1 Aug. 26, 2010

Related U.S. Application Data

(60) Provisional application No. 61/201,073, filed on Dec. 4, 2008.

(30) Foreign Application Priority Data

Dec. 4, 2008 (DE) .......................... 10 2008 060 550

(51) Int. Cl.
B64C 1/00 (2006.01)
(52) U.S. Cl. ...................................................... 244/119
(58) Field of Classification Search .................. 244/119, 244/133, 117 R; 174/384; 361/218
See application file for complete search history.

(56) References Cited

U.S. PATENT DOCUMENTS

| | | | | |
|---|---|---|---|---|
| 6,498,297 B2 * | 12/2002 | Samhammer | ............. | 174/72 A |
| 7,182,291 B2 * | 2/2007 | Westre et al. | ............. | 244/119 |
| 7,185,850 B2 * | 3/2007 | Callahan et al. | ............. | 244/118.6 |
| 7,188,805 B2 * | 3/2007 | Henley et al. | ............. | 244/118.5 |
| 7,191,981 B2 * | 3/2007 | Laib et al. | ............. | 244/118.6 |
| 7,207,523 B2 * | 4/2007 | Callahan et al. | ............. | 244/118.6 |
| 7,370,831 B2 * | 5/2008 | Laib et al. | ............. | 244/118.5 |
| 7,503,522 B2 * | 3/2009 | Henley et al. | ............. | 244/118.5 |
| 7,938,362 B2 * | 5/2011 | Kismarton et al. | ............. | 244/117 R |
| 7,988,231 B2 * | 8/2011 | Phinney | ............. | 297/257 |
| 8,033,501 B2 * | 10/2011 | Callahan et al. | ............. | 244/118.6 |
| 2002/0144835 A1 * | 10/2002 | Samhammer | ............. | 174/72 A |
| 2004/0029445 A1 | 2/2004 | Chapman et al. | | |
| 2004/0129445 A1 * | 7/2004 | Winkelbach et al. | ............. | 174/76 |
| 2006/0202084 A1 | 9/2006 | Smallhorn | | |
| 2007/0018045 A1 * | 1/2007 | Callahan et al. | ............. | 244/118.6 |
| 2007/0193146 A1 * | 8/2007 | Carstensen et al. | ............. | 52/268 |
| 2008/0210820 A1 * | 9/2008 | Kismarton et al. | ............. | 244/120 |
| 2009/0184199 A1 * | 7/2009 | Leisten et al. | ............. | 244/1 A |

FOREIGN PATENT DOCUMENTS

| | | |
|---|---|---|
| DE | 10244189 | 6/2003 |
| DE | 10248241 A1 | 5/2004 |
| GB | 2382872 A | 6/2003 |

* cited by examiner

*Primary Examiner* — Philip J Bonzell
(74) *Attorney, Agent, or Firm* — Lerner, David, Littenberg, Krumholz & Mentlik, LLP

(57) ABSTRACT

An arrangement for installing electric cables in the floor region of an aircraft includes longitudinal guide elements that form cable channels and essentially extend in the longitudinal direction of the aircraft parallel to seat rails that are arranged in the aircraft floor and serve for the mechanical attachment of seat legs. The longitudinal guide elements, which accommodate the data and supply cables to be installed, are not visible to aircraft passengers, but are still readily and easily accessible to the maintenance personnel. The floor plate features an elongate groove-shaped recess extending parallel to the seat rail in the longitudinal direction of the aircraft in the immediate vicinity of one of the two seat rails, wherein an elongate extruded profile is arranged in said recess. The extruded profile features an elongate drawer for transmitting shearing forces and an elongate cable shaft arranged above the drawer and serves for accommodating electric cables.

18 Claims, 2 Drawing Sheets

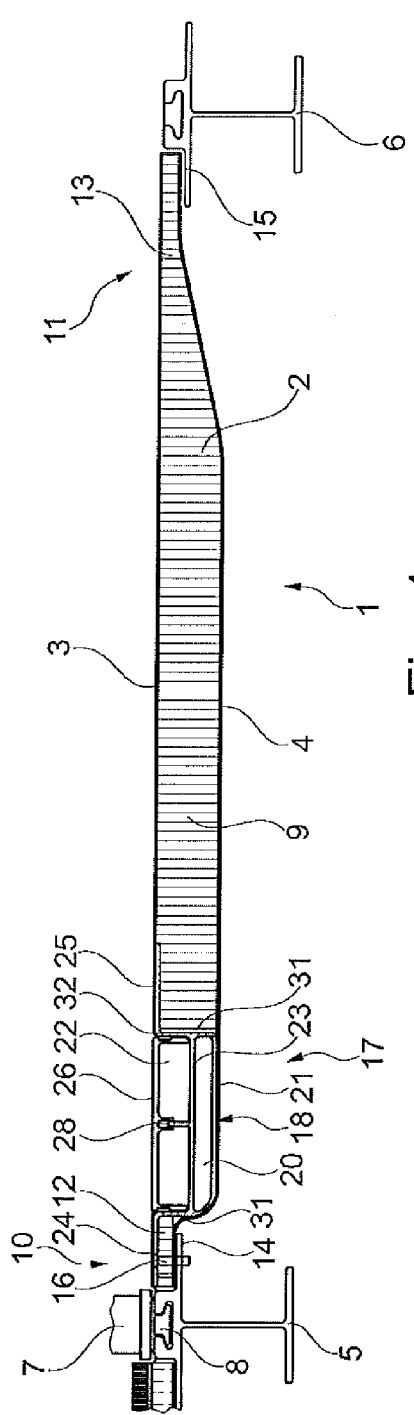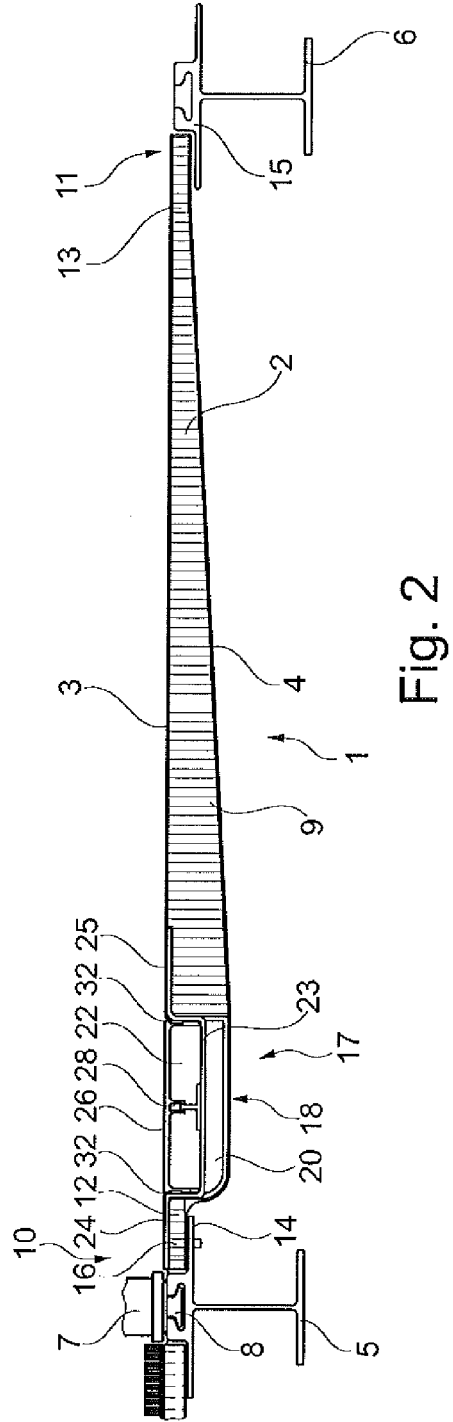

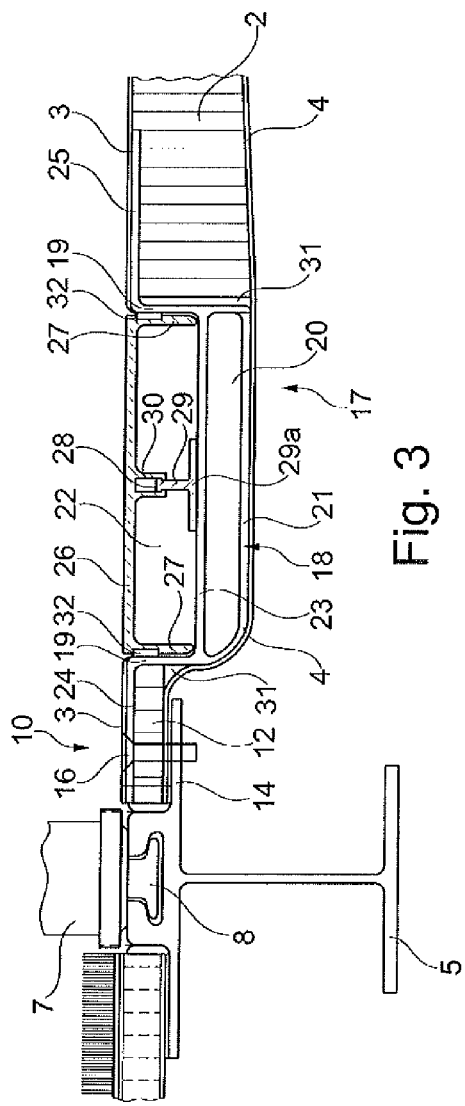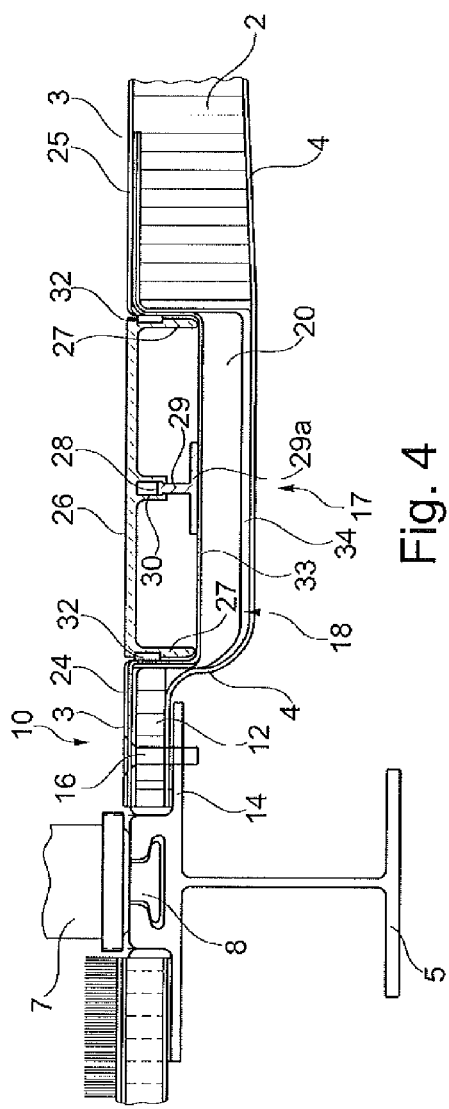

ARRANGEMENT FOR INSTALLING ELECTRIC CABLES IN THE FLOOR REGION OF AN AIRCRAFT

CROSS-REFERENCE TO RELATED APPLICATIONS

This application claims the benefit of the filing date of U.S. Provisional Patent Application No. 61/201,073 filed Dec. 4, 2008, the disclosure of which application is hereby incorporated herein by reference.

BACKGROUND OF THE INVENTION

The invention relates to an arrangement for installing electric cables in the floor region of an aircraft, wherein longitudinal guide elements are provided that form cable channels and essentially extend in the longitudinal direction of the aircraft parallel to seat rails that are arranged in the aircraft floor and serve for the mechanical attachment of seat legs, as well as to a method for manufacturing the arrangement.

An arrangement of the initially cited type is known from German Patent Application No. DE 102 48 241 A1, wherein lateral guide elements that also form cable channels are provided in addition to longitudinal guide elements. The longitudinal and lateral guide elements are respectively composed of lower parts and upper parts, wherein the lower parts are mounted on the aircraft floor and the upper parts are arranged on the lower parts. A cable junction is provided on at least one intersecting point of longitudinal and lateral guide elements and forms a cable installation path with a longitudinal and a lateral guide element. All guide elements are arranged above the aircraft floor such that tripping hazards for aircraft passengers may be created.

Furthermore, US Patent Publication No. 2002/0144835 A1 describes a protected cable installation path in the region of a seat rail of an aircraft, wherein the cable installation takes place within a cable guide in the form of a longitudinal guide element. This elongate guide element also consists of an upper part and a bottom part that is mounted above the floor of the aircraft, namely between the outer cabin wall and the seats situated directly adjacent to this wall. Consequently, a tripping hazard for aircraft passengers does not exist in the described application; however, the utilization of this guide element in seat areas that lie in the cabin interior may also result in tripping hazards. Furthermore the known cable installation path may entail an inflexible change of the layout in the cabin, an inferior accessibility to the installed electric lines, as well as a high expenditure for the preparation of construction documents that are dependent on the layout and for the incorporation of the technology into the aircraft cabin. There may also be optical and technical design disadvantages because the cable guide elements are visible to the passengers.

BRIEF SUMMARY OF THE INVENTION

The invention may provide an arrangement of the initially cited type, in which the longitudinal guide elements that accommodate the data and supply cables to be installed are not visible to the aircraft passengers, but still readily and easily accessible to the maintenance personnel.

According to the invention, an elongate groove-shaped recess is provided that extends in the longitudinal direction of the aircraft parallel to the seat rail in a floor plate that is arranged between two parallel seat rails. The seat rails serve for attaching the legs of an assigned seat or several seats that lie behind one another in the longitudinal direction of the aircraft. The recess is arranged in the immediate vicinity of one of the two seat rails. An elongate extruded profile is arranged in the groove-shaped recess or groove and features an elongate drawer for transmitting shearing forces and other possibly occurring forces, as well as an elongate cable shaft for accommodating electric cables that is arranged above the drawer.

According to another embodiment of the invention, the floor plate is realized in the form of a sandwich component that consists of a honeycomb structure with two outer cover layers and the extruded profile is laminated into the groove-shaped recess of the honeycomb structure in such a way that the bottom of the drawer lies on and is bonded to the lower cover layer of the honeycomb structure and the intermediate spaces between the outer side walls of the extruded profile and the inner side walls of the groove-shaped recess are filled with core filler compound and/or adhesive.

Other embodiments of the invention are described in dependent claims 3 to 17.

One advantage of the invention may be seen in that an electrical system is integrated into a mechanical primary structure of an aircraft, especially in floor plates that are arranged between seat rails, such that applicable aircraft-specific regulations are fulfilled and the above-described disadvantages are avoided. The installation of a plurality of electric data and supply cables from one seat to another seat, preferably a seat that is situated directly adjacent in the longitudinal direction of the aircraft, is significantly simplified. This type of seat-to-seat cabling may serve, for example, for supplying electric connecting elements assigned to passenger seats or entertainment systems integrated into passenger seats.

BRIEF DESCRIPTION OF THE DRAWINGS

One embodiment according to the invention is illustrated in the drawings that are not true-to-scale, wherein:

FIG. 1 shows a floor plate of approximately rectangular cross section that is arranged between two seat rails and features an integrated extruded profile, FIG. 2 shows a floor plate of approximately trapezoidal cross section that is arranged between two seat rails and features an integrated extruded profile, FIG. 3 shows an enlarged detail of the arrangement according to FIG. 1, and FIG. 4 shows an enlarged representation of an extruded profile that consists of two prepreg shells and is arranged in a floor plate.

DETAILED DESCRIPTION

In FIG. 1, a floor plate 1 is realized in the form of a sandwich component that consists of a honeycomb structure 2 with two outer cover layers 3 and 4, wherein the honeycomb structure 2 may consist of plastic and the cover layers 3 and 4 may consist of plastic that is reinforced with carbon fibers or glass fibers. For example, these outer cover layers may consist of a carbon fibre reinforced plastic (CFK)-layer that is situated adjacent to the honeycomb structure, a central CFK-layer and an outer glass fibre reinforced plastic (GFK)-layer that are not graphically illustrated. The floor plate 1 is arranged between the seat rails 5 and 6 that extend parallel to one another in the longitudinal direction of the aircraft and serve for attaching seat legs 7 of one or more passenger seat(s) by means of conventional tongue and groove clamping connections 8. It may have a width, for example, of 493 mm between the seat rails 5 and 6 while its length may extend over one seat or several seats that are arranged behind one another in the longitudinal direction of the aircraft. In its central region, the honeycomb structure 2 of the sandwich component according to FIG. 1 has a predetermined, approximately rectangular cross section 9 while the cross section 9 of the honeycomb structure 2 according to FIG. 2 is realized in an approximately trapezoidal fashion. In this case, the maximum thickness of the trapezoidal cross section 9 may amount to approximately 27 mm in the immediate vicinity of an extruded profile 18 and the minimum thickness on the opposite side may amount to approximately 9.5 mm. In the edge regions 10 and 11 that extend parallel to the seat rails 5 and 6, the honeycomb structures are respectively realized with cross sections 12 and 13 that are reduced in comparison with the predetermined cross sections 9 and have a thickness, for example, of 9.5 mm. The edge regions 10 and 11 with their reduced cross sections 12 and 13 lie on longitudinal surfaces 14 and 15 of the assigned seat rails 5 and 6 and are mechanically mounted thereon, for example, by means of screw connections 16.

The enlarged illustrations according to FIGS. 3 and 4, in particular, clearly show that the floor plate 1 features an elongate groove-shaped recess 17 that is arranged in the immediate vicinity of the seat rail 5 and extends parallel to the seat rail 5 in the longitudinal direction of the aircraft, wherein an elongate extruded profile 18 is arranged in said recess. The extruded profile 18 may have a width of approximately 75 mm and consists of an elongate drawer 20 for transmitting shearing forces and other possibly occurring forces, as well as an elongate cable shaft 22 that is arranged above the drawer 20 and serves for accommodating electric cables. The drawer 20 with a depth, for example, of 11 mm and the cable shaft 22 that may have a depth, for example, of 13 mm are separated from one another by an intermediate wall 23 extending in the longitudinal direction of the aircraft. The extruded profile 18 is integrated into the groove-shaped recess 17 of the honeycomb structure 2 in such a way that the bottom 21 of the drawer 20 lies on the bottom cover layer 4 and is bonded to this cover layer while the intermediate spaces between the outer side walls 19 of the extruded profile 18 and the inner side walls of the groove-shaped recess 17 are filled with core filler compound and/or adhesive 31.

The extruded profile 18 that may be manufactured of glass fiber-reinforced plastic, carbon fiber-reinforced plastic or aluminum is equipped with flanges 24 and 25 in the upper region of the cable shaft 23 such that it can be additionally fixed on the honeycomb structure 2. These flanges extend from the outer side walls 19 of the extruded profile 18 in the direction of the respectively adjacent honeycomb structure 2 and are bonded to the upper cover layer 3 and to the honeycomb structure 2 underneath this upper cover layer. However, the flanges 24 and 25 may also lie on the upper cover layer 3 and be bonded to this cover layer, preferably in the directly adjacent region of the seat rail 5. The flanges 25 are mechanically mounted on the longitudinal surface 14 of the seat rail 5 together with the edge region 10 of the honeycomb structure 2 by means of a screw connection 16. According to FIG. 3, it may be practical to also fill the intermediate spaces between the outer cover layers 3 and 4, for example a CFK-layer, and the honeycomb structure 2 or the flange 25 with core filler compound and/or adhesive 31.

FIG. 4 shows that the extruded profile 18 consists of two prepreg shells of carbon fiber-reinforced plastic that are bonded to one another, wherein the upper CFK part 33 forms the cable shaft 22 and the lower CFK part 34 forms the drawer 20. In this case, the aforementioned intermediate wall 23 and the flanges 24 and 25 of the extruded profile 18 are integrated into the upper CFK part 33.

FIGS. 1, 2, 3 and 4 show that the elongate opening of the cable shaft 22 is closed by means of an elongate cover 26 with angled side walls 27, wherein the side walls 27 engage into the cable shaft 22 and adjoin the inner side walls thereof. If an extruded profile 18 of aluminum is used, it may be advantageous to apply a non-conductive layer that is not graphically illustrated on the aluminum surface of the cable channel 22 in the cable shaft 22 because the cables, lines or the like to be arranged in the cable channel 22 cannot lie on a bare metal surface. The insulating layer may consist of glass fiber-reinforced plastic. It would also be possible for the upper cover layer 3 or the outer GFK-layer of this cover layer 3 to extend through the cable channel 22 as an insulating layer. Sealing means 32 are advantageously provided between the adjoining surfaces of the side walls of the cover and the cable shaft 22 in order to realize a protection against moisture and unauthorized access. The side walls 27 of the cover 26 advantageously consist of plastic and are preferably arranged perpendicular to the undesignated longitudinal surface of the cover 26. Other angled bends are possible and dependent on the relative position between the elongate inner surfaces of the side walls of the cable shaft 22. The elongate cover 26 is mounted in the cable shaft 22 by means of a snap-on system 28 that consists of several clamping pins 29 that are mounted on the intermediate wall 23 between the drawer 20 and the cable shaft 22, protrude into the cable shaft 22 and are preferably equipped with mounting flanges 29a, as well as of clamping sleeves 30 that cooperate with these clamping pins 29. For this purpose, the clamping sleeves 30 are mounted on the inner surface of the cover 26 that faces the cable shaft 22 and the mounting flanges 29a of the clamping pins 29 are mounted on the bottom of the cable shaft 22 or the insulating layer covering this bottom, for example, by means of an adhesive connection. Alternatively, the clamping sleeves 30 may be mounted on the bottom of the cable shaft 22 and the clamping pins 29 may be mounted on the inner surface of the cover 26. The snap-on system 28 may extend over the entire length of the cover 26 on one hand and over the entire length of the cable shaft 22 on the other hand. In this case, several covers 26 lie behind one another edge-to-edge over the entire length of the groove-shaped recess 17 that corresponds to the seat rail length.

An inventive method for manufacturing an arrangement of the above-described type by utilizing a floor plate 1 that is realized in the form of a sandwich construction and arranged between two seat rails 5 and 6 extending in the longitudinal direction of an aircraft is characterized by the following process steps:

the floor plate 1 is slit open in the region of the seat rail 5 in such a way that an elongate groove-shaped recess 17 is created that is arranged parallel to the seat rail 5 and serves for accommodating an extruded profile 18 provided with mounting flanges 24 and 25, the extruded profile 18 that forms a drawer 20 and a cable shaft 22 is fitted into the groove-shaped recess 17 and baked in an autoclave for lamination purposes in such a way that the underside of the extruded profile 18 lies on and is bonded to the lower cover layer 4 of the sandwich component and the intermediate spaces between the side walls of the extruded profile 18 and the honeycomb structure 2 and, if applicable, the intermediate spaces between the mounting flanges 24 and 25 and the honeycomb structure 2 are filled with core filler compound and/or adhesive 31, and the mounting flanges 25 situated adjacent to the predetermined cross section 9 of the honeycomb structure are bonded to the upper cover layer 3 and to the honeycomb structure 2 underneath this upper cover layer. In this case, the mounting flanges 24 arranged in the adjacent region of the seat rail 5 may be alternatively placed on the upper cover layer 3 in the edge region 10 of the honeycomb structure 2 and bonded to the cover layer 3 at this location.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. The reference symbols in the claims should not be interpreted in a restrictive sense.

LIST OF REFERENCE SYMBOLS

1 Floor plate
2 Honeycomb structure
3 Outer cover layer of honeycomb structure 2
4 Outer cover layer of honeycomb structure 2
5 Seat rail
6 Seat rail
7 Leg of a seat
8 Tongue and groove clamping connection
9 Cross section of honeycomb structure 2
10 Edge region of honeycomb structure 2
11 Edge region of honeycomb structure 2
12 Cross section of an edge region of honeycomb structure 2
13 Cross section of an edge region of honeycomb structure 2
14 Longitudinal surface of seat rail 5
15 Longitudinal surface of seat rail 6
16 Screw connection
17 Groove-shaped recess in honeycomb structure 2
18 Extruded profile
19 Outer side walls of extruded profile 18
20 Drawer
21 Bottom of drawer 20
22 Cable shaft
23 Intermediate wall between drawer 20 and cable shaft 22
24 Flange of extruded profile 18
25 Flange of extruded profile 18
26 Elongate cover
27 Side wall of cover 26
28 Snap-on system
29 Clamping pin with mounting flange 29a of snap-on system 28
30 Clamping sleeve of snap-on system 28
31 Core filler compound and/or adhesive
32 Sealing means for side walls of the cover 26 and the cable shaft 22
33 Upper CFK part of bonded prepreg shells
34 Lower CFK part of bonded prepreg shells

The invention claimed is:

1. An arrangement for installing electric cables in the floor region of an aircraft, comprising:
    an aircraft floor comprising a floor plate;
    first and second seat rails arranged in the aircraft floor for the mechanical attachment of seat legs of one or more seats;
    a plurality of longitudinal guide elements forming cable channels and essentially extending in the longitudinal direction of the aircraft parallel to the first and second seat rails;
    an elongate groove-shaped recess defined in the floor plate extending in the longitudinal direction of the aircraft parallel to and arranged between the first and second seat rails, in the immediate vicinity of one of the first and second tw seat rails; and
    an elongate extruded profile arranged in the groove-shaped recess of the floor plate and integrated into the floor plate, the profile comprising an elongate drawer for transmitting shearing forces and an elongate cable shaft for accommodating electric cables arranged above the drawer.

2. The arrangement of claim 1, wherein the extruded profile comprises first and second flanges in an upper region of a cable shaft, and wherein the first and second flanges extend from outer side walls of the extruded profile in the direction of an adjacent honeycomb structure and are either bonded to the second cover layer and the honeycomb structure underneath the second cover layer or lie on the second cover layer in the adjacent region of the seat rail and are bonded to the second cover layer thereat.

3. The arrangement of claim 1, wherein the extruded profile is made of glass fiber-reinforced plastic.

4. The arrangement of claim 1, wherein the extruded profile is made of carbon fiber-reinforced plastic.

5. The arrangement of claim 4, wherein the extruded profile comprises first and second prepreg shells of carbon fiber reinforced plastic bonded together, and wherein an upper carbon fibre reinforced plastic part forms the cable shaft and a lower carbon fibre reinforced plastic part forms the drawer.

6. The arrangement of claim 1, wherein the extruded profile is manufactured of aluminum and a second cover layer of the honeycomb structure or an outer glass fibre reinforced plastic-layer of the second cover layer extends through the cable shaft of the extruded profile.

7. The arrangement of claim 1, wherein the floor plate comprises a sandwich component, the sandwich component comprising a honeycomb structure with first and second outer cover layers, and wherein the extruded profile is laminated into the groove-shaped recess of the honeycomb structure in such a way that a bottom of the drawer lies on and is bonded to the first cover layer of the honeycomb structure and intermediate spaces between outer side walls of the extruded profile and inner side walls of the groove-shaped recess are filled with at least one of a core filler compound and adhesive.

8. The arrangement of claim 7, wherein the first and second outer cover layers comprise a carbon fibre reinforced plastic layer situated adjacent to the honeycomb structure, a central carbon fibre reinforced plastic-layer and an outer glass fibre reinforced plastic-layer.

9. The arrangement of claim 7, wherein the honeycomb structure of the sandwich component forming the floor plate comprises a predetermined cross section, wherein the honeycomb structure has a cross section that is reduced in comparison to the predetermined cross section in its edge regions that extend parallel to the seat rails, and wherein the edge regions lie on longitudinal surfaces of the assigned seat rails with their reduced cross sections and are mechanically fixed thereon.

10. The arrangement of claim 1, wherein an opening of the elongate cable shaft is closed by an elongate cover with angled side walls, and wherein side walls of the cover engage into the cable shaft and adjoin inner side walls thereof.

11. The arrangement of claim 10, wherein sealing means are arranged between adjoining surfaces of the side walls of the cover and of the cable shaft.

12. The arrangement of claim 10, wherein the cover is made of plastic.

13. The arrangement of claim 10, wherein the elongate cover is fixed in the elongate cable shaft by a snap-on system comprising a plurality of clamping pins and clamping sleeves cooperating therewith.

14. The arrangement of claim 13, wherein the snap-on system extends over the entire length of the cover and over the entire length of the cable shaft.

15. The arrangement of claim 13, wherein the clamping pins or clamping sleeves of the snap-on system are bonded to the bottom of the cable shaft or to an insulating layer that covers the bottom.

16. The arrangement of claim 1, further comprising an extruded aluminum profile in the cable shaft and a non-conductive layer applied on an aluminum surface.

17. The arrangement of claim 16, further comprising an insulating layer of glass fiber-reinforced plastic arranged in the cable shaft of the extruded aluminum profile.

18. A method for manufacturing an arrangement for installing electric cables in the floor region of an aircraft by utilizing a floor plate comprising a sandwich component and arranged between first and second seat rails extending in a longitudinal direction of the aircraft, wherein the floor plate is slit open in the region of one of the first and second seat rails in such a way that an elongate groove-shaped recess is created parallel to the first and second seat rails for accommodating an extruded profile comprising first and second mounting flanges, wherein the extruded profile forms a drawer and a cable shaft and is fitted into the groove-shaped recess and baked in an autoclave for lamination purposes in such a way that the underside of the extruded profile lies on and is bonded to a lower cover layer of the sandwich component and intermediate spaces between side walls of the extruded profile and a honeycomb structure and the intermediate spaces between the mounting flanges and the honeycomb structure are filled with at least one of a core filler compound and an adhesive, and wherein the first and second mounting flanges situated adjacent to the cross section of the honeycomb structure are bonded to a first cover layer and to the honeycomb structure underneath the first cover layer.

* * * * *

UNITED STATES PATENT AND TRADEMARK OFFICE
CERTIFICATE OF CORRECTION

PATENT NO. : 8,366,042 B2  
APPLICATION NO. : 12/629171  
DATED : February 5, 2013  
INVENTOR(S) : Jan Haselmeier et al.

Page 1 of 1

It is certified that error appears in the above-identified patent and that said Letters Patent is hereby corrected as shown below:

In the Claims

Column 6, line 9, after "second" delete "tw".

Signed and Sealed this
Eighteenth Day of August, 2015

Michelle K. Lee
*Director of the United States Patent and Trademark Office*